Feb. 26, 1935.   C. J. DUNZWEILER   1,992,817
PLATE HOLDDOWN
Filed Dec. 21, 1931
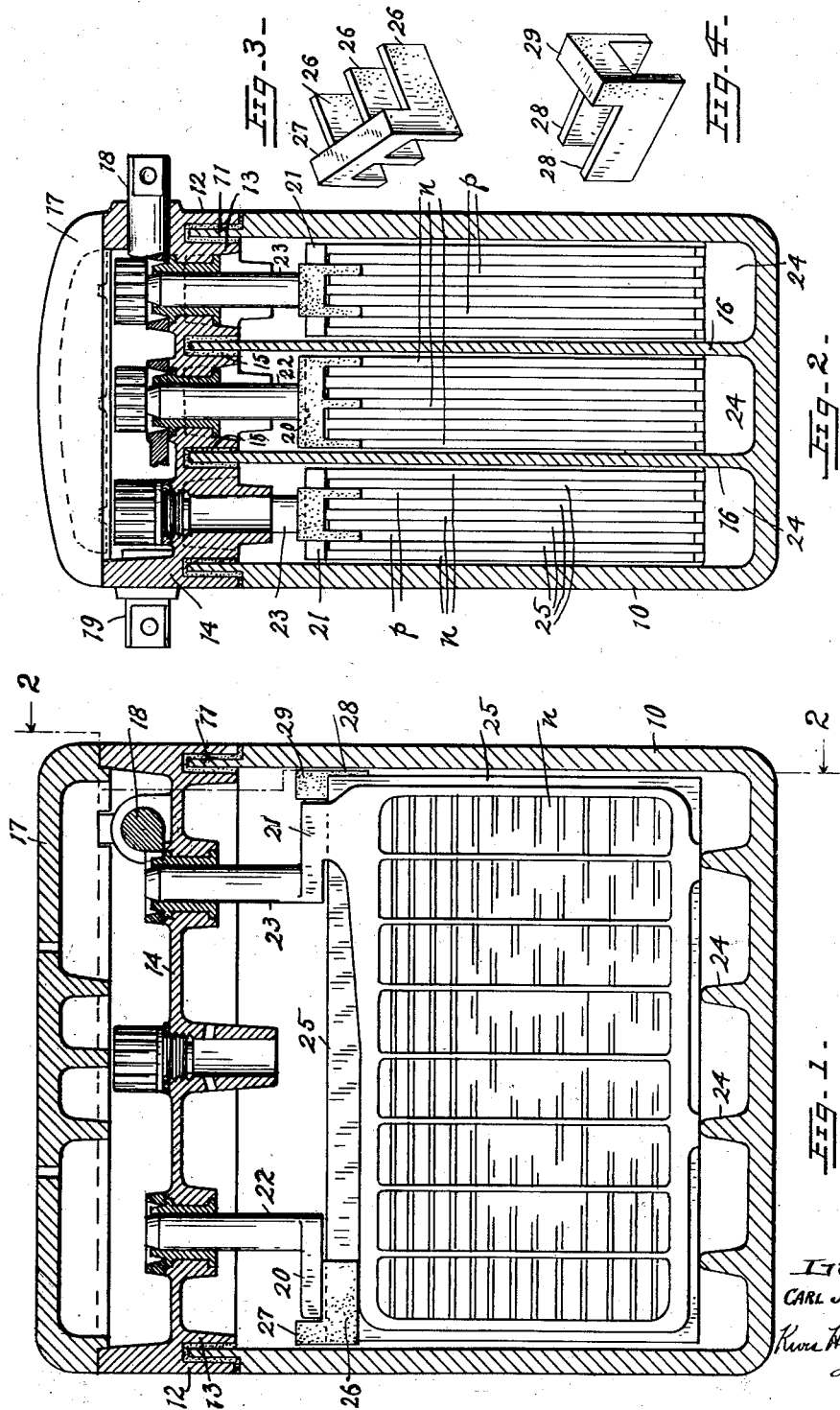
Inventor
CARL J. DUNZWEILER Patented Feb. 26, 1935

1,992,817

UNITED STATES PATENT OFFICE 1,992,817

PLATE HOLDDOWN

Carl J. Dunzweiler, Cleveland, Ohio, assignor to Willard Storage Battery Company, Cleveland, Ohio, a corporation of West Virginia Application December 21, 1931, Serial No. 582,218

7 Claims. (Cl. 136—81)

This invention relates to improvements in plate holddowns for storage batteries. In a storage battery cell there are two groups of plates, one positive and one negative, the plates of each group being connected to a strap from which a terminal post extends. The strap, of course, stands crosswise of the element and is usually located quite near one end thereof, and adjacent an end wall of the cell. The post, being mounted in the cell cover, serves to hold down the corresponding strap and the plates of that group at its end of the cell, but at the other end of the cell in batteries as heretofore constructed, there is nothing to prevent the plates from tilting upwardly, as they will do under some conditions of use, and finally making contact with the strap of the other group, which results in a complete short-circuiting of the cell.

The primary object of the present invention is the provision of means for preventing such tilting movement of the plates.

A secondary object is the provision of means for taking some of the strains which would otherwise be imposed upon the terminal posts and associated parts in a vehicle storage battery.

Other objects and features of novelty will appear as I proceed with the description of that embodiment of the invention which, for the purposes of the present application, I have illustrated in the accompanying drawing, in which Figure 1 is an elevational view of a battery element embodying the invention, the battery container within which it is mounted being shown in vertical section.

Fig. 2 is an end elevation of the same, the battery container being shown in transverse vertical section taken substantially along the line 2—2 of Fig. 1, and Figs. 3 and 4 are detail perspective views of the holddowns for groups of plates of opposite polarity in a five-plate cell.

I have illustrated the invention herein as applied to a three-cell battery of the type commonly used in motorcycles. The invention is particularly desirable for batteries of this kind, inasmuch as they are called upon to withstand strains and shocks of considerable magnitude. It is, however, useful in batteries employed for other purposes.

In the drawing the container of the battery is shown at 10. At its upper edge it is rabbeted to provide an encircling rib 11 which is straddled by a pair of ribs 12 and 13 on a multiple cell cover 14, the cover being provided also with grooves 15 for the reception of partitions 16. The cover and container may be sealed together with suitable cement in the usual manner. Above the cover 14 I may use a further dust cap or cover 17. 18 and 19 are connectors which extend through the cover 14 at opposite ends thereof, and are attached to the terminals of the battery.

The battery element in each cell comprises a certain number of positive and a certain number of negative plates, the positive plates $p$ in the present instance being connected together in groups by straps 20, and the negative plates $n$ by straps 21, from which rise integral terminal posts 22 and 23 respectively. The plates rest upon ribs 24 molded onto the container bottom. Between adjacent positive and negative plates are separators 25, which extend laterally somewhat beyond the side edges of the plates, as indicated in Fig. 1. The vertical dimension of the separators is such that their upper edges come almost to the lower surfaces of the straps 20 and 21 when the separators are flush with the lower edges of the plates.

The hold-down means for the two groups of plates are shown in detail in Figs. 3 and 4 for battery elements comprising three plates of one polarity and two plates of the other polarity. It will be understood that when a greater or lesser number of plates are employed, the hold-down means will vary accordingly. The hold-down means of Fig. 3, intended for the group of negative plates, includes three rectangular pieces 26 of stiff insulation material spaced apart and joined together by a member 27. The parts 26 and 27 are preferably integral, and may be molded of hard rubber, or other suitable stiff insulation material capable of withstanding the chemical action of the electrolyte. The other hold-down means shown in Fig. 4 for the group of positive plates includes two rectangular insulation pieces 28 spaced and joined together by a member 29. The spacing of the pieces 28 is the same as that of the pieces 26, that is to say they are spaced sufficiently in both instances to accommodate one plate and two separators.

When the battery element is otherwise assembled, the insulation pieces 26 are pushed into the spaces between the strap 20 and the upper edges of the negative plates $n$, the member 27 thereby moving into position in the angle between the strap 20 and the upper edges of the separators 25. At the other end of the element the pieces 28 are caused to enter the spaces between the strap 21 and the positive plate $p$, the member 29 entering the angle between the strap 21 and the upper edges of the separators. The hold-downs are therefore carried by the separators and held from movement inwardly by the straps, and since they abut against the straps 20 or 21, as the case may be, which are held down by the terminal posts, they serve to positively prevent upward movement of the free ends of the plates either singly or in groups.

The members 27 and 29 are preferably of a width to bridge almost completely the spaces between the straps 20 and 21 and the end walls of the cells, and thereby serve to prevent the straps 20 and 21 from moving outwardly. In other words the battery elements are locked against movement in their own planes in one direction by the pieces 26 and 28 and in the other direction by the members 27 and 29, and the terminal posts 22 and 23 are thereby relieved of some of the strains to which they might otherwise be subjected. The principal function of the hold-downs however is of course the prevention of short-circuits such as would occur if the free ends of the plates tilted upwardly until contact was had with the strap of the other group, and to prevent short-circuiting where a break in a plate takes place and the upper part of the plate only tends to tilt upwardly.

In the foregoing description I have necessarily gone somewhat into detail in order to explain fully the particular embodiments of the invention herein illustrated, but I desire it to be understood that such detailed disclosures are not to be construed as amounting to limitations, except as they may be included in the appended claims.

Having thus described my invention, I claim:

1. A storage battery element, comprising a group of positive plates joined by a strap, and a group of negative plates joined by a strap, said two groups of plates being interleaved, separators interposed between adjacent positive and negative plates, and pieces of insulation of the same thickness approximately as the said plates interposed between the plates of one group and the strap of the other group, said insulation pieces being carried by said separators.

2. A storage battery element comprising a group of positive plates joined by a strap and a group of negative plates joined by a strap, said two groups of plates being interleaved, separators interposed between adjacent positive and negative plates, said separators projecting laterally beyond said straps, pieces of insulation of the same thickness approximately as the said plates interposed between adjacent separators above the plates and below the strap adjacent thereto to space the plates away from the adjacent strap, and a member joining said insulation pieces, said member lying in the angle formed between the outer side of the strap and the upper edges of the separators.

3. In a storage battery, a battery container, a battery element mounted therein comprising a group of positive plates joined by a strap and a group of negative plates joined by a strap, said two groups of plates being interleaved, separators interposed between adjacent positive and negative plates, pieces of insulation of the same thickness approximately as the said plates interposed between adjacent separators above the plates and below the strap adjacent thereto to space the latter away from the adjacent strap, and a member joining said insulation pieces, said member lying in the angle formed between the upper side of the strap and the upper edges of the separators and extending from the strap approximately to the inner wall of the container.

4. A storage battery element comprising a group of positive plates joined by a strap and a group of negative plates joined by a strap, said two groups of plates being interleaved, separators interposed between adjacent positive and negative plates, pieces of insulation of the same thickness approximately as said plates interposed between adjacent separators above the plates and below the straps adjacent thereto to space the plates of one group away from the strap of the other group, said pieces of insulation extending laterally beyond the adjacent strap, and a pair of members arranged above the separators to one side of the adjacent straps, each of said members joining the insulation pieces at that end of the element, whereby their displacement during the use of the battery is prevented.

5. In a storage battery, the combination of a container provided with a cell compartment, a plurality of positive and negative plates alternately arranged in said compartment, separators interposed between adjacent plates, straps at opposite ends of said compartment and connected to extensions on the upper edges of said positive and negative plates respectively to form positive and negative groups with the strap of one group extending over the free end of a plate of the other group but spaced therefrom, and insulation members positioned between said extensions and the adjacent wall of said compartment, said members having portions thereof underlying the straps adjacent thereto and a downwardly extending projection on each of said members overlying the upper edge of one of the plates of the other group whereby a plate of one group is prevented from contacting the strap of the other group.

6. In a storage battery, the combination of a container having a cell compartment, a plurality of positive and negative plates alternately arranged in said cell compartment, separators interposed between adjacent plates, straps at opposite ends of said compartment connected to the upper edge of said positive and negative plates respectively, to form positive and negative groups with the straps of one group extending over the free ends of a plurality of plates of the other group but spaced therefrom, insulation members having portions thereof underlying said straps and positioned adjacent the end walls of said compartment, each of said members being provided with downwardly extending projections overlying the upper edges of a plurality of plates of the other group whereby the plates of one group are held spaced from the strap of the other group.

7. In a storage battery, the combination of a container having a cell compartment, a plurality of positive and negative plates alternately arranged in said compartment, separators interposed between adjacent plates, straps at opposite ends of said compartment connected to the upper edges of said positive and negative plates respectively, to form positive and negative groups with the straps of one group extending over the free ends of a plurality of plates of the other group but spaced therefrom, an insulation members positioned between said straps and the adjacent walls of said compartment, said members being provided with a plurality of projections each approximately the width of one of said plates extending underneath the adjacent strap and above the upper edges of the plates of the other group whereby the plates of one group are held spaced from the strap of the other group.

CARL J. DUNZWEILER.